United States Patent
Pirincci

(10) Patent No.: US 8,112,992 B2
(45) Date of Patent: Feb. 14, 2012

(54) JAY GRAVI-BUOYANT BALLS

(76) Inventor: Jay Pirincci, Sunny Isles Beach, FL (US)

(*) Notice: Subject to any disclaimer, the term of this patent is extended or adjusted under 35 U.S.C. 154(b) by 478 days.

(21) Appl. No.: 12/321,968

(22) Filed: Jan. 27, 2009

(65) Prior Publication Data

US 2010/0187833 A1 Jul. 29, 2010

(51) Int. Cl.
*F03C 1/00* (2006.01)
(52) U.S. Cl. ............................................. 60/495; 60/496
(58) Field of Classification Search ............. 60/495–496
See application file for complete search history.

(56) References Cited

U.S. PATENT DOCUMENTS

| | | | | |
|---|---|---|---|---|
| 3,857,242 A | * | 12/1974 | Gilmore | 60/495 |
| 4,538,415 A | * | 9/1985 | Lebecque | 60/639 |
| 6,249,057 B1 | * | 6/2001 | Lehet | 290/1 R |
| 7,134,283 B2 | * | 11/2006 | Villalobos | 60/639 |

* cited by examiner

*Primary Examiner* — Hoang Nguyen

(57) ABSTRACT

This is an energy or electricity generation process or system that converts mechanical energy into electrical energy comprised of a design using gas or air, liquid or water and solids in high, rectangular and sealed chambers where specially designed mainly solid, spherical, buoyant bodies, objects or devices circulate up and down using the full potential of gravity to drop down, activate a mechanism to initiate an alternator in one chamber and then employ the process and power of buoyancy in water in another chamber to lift back up to it's original point at the top to start all over again circulating continuously wherefore supplying energy continuously.

20 Claims, 5 Drawing Sheets

LAKESIDE

EARTH HOLE

JAY GRAVI-BUOYANT BALLS

CROSS REFERENCE TO RELATED APPLICATION

This application claims priority to provisional application No. 61/194,979 filed on date—Oct. 2, 2008

BACKGROUND INFORMATION

Solids, liquids and gases have been used separately or in conjunction with each other in many types of moving systems in order to generate rotational mechanical energy. The three states of matter, solids, liquids and gasses provide the flexibility of their natural composition for efficient conversion to mechanical energy. The pumping or movement of gases and liquids have been used for the triggering or actuating of solids like a piston, lever, bar or switch etc. especially since it is much easier to move, operate or maneuver thru winding, obstructed and difficult to reach and control paths using flexible matter such as air and water rather than solids. They have been used together for movement depending on the situation, purpose and time. Conventional methods for energy or electricity generation using liquids require a water source to be located at a high altitude to provide a steep vertical fall such as a waterfall that is fed by a river or stream to be functional which will also necessitate the rerouting of rivers and the redesigning of the environment and terrain. Energy created by the use of coal, oil, natural gas, wood or other natural resources in furnaces will not only eventually run out as we are witnessing but will produce harmful gases as an end product which will be an endless abuse of the environment and the earth's surface. Solar panels, wind mills and other similar systems used that take advantage of the environment's natural forces are unreliable and inconsistent forms of energy that seem efficient and cost effective only when current methods such as oil become more and more expensive to operate if we do not consider the fact that these unattractive contraptions will have to cover the earth to provide enough energy for all our needs. There is a serious need for a clean, safe, efficient and let me add attractive system which can be sheltered or secluded underground or above that will not deplete the earth of it's natural ingredients and pollute the environment with toxic concentrated recycled chemical elements.

SPECIFICATIONS

Description

Figure 1:
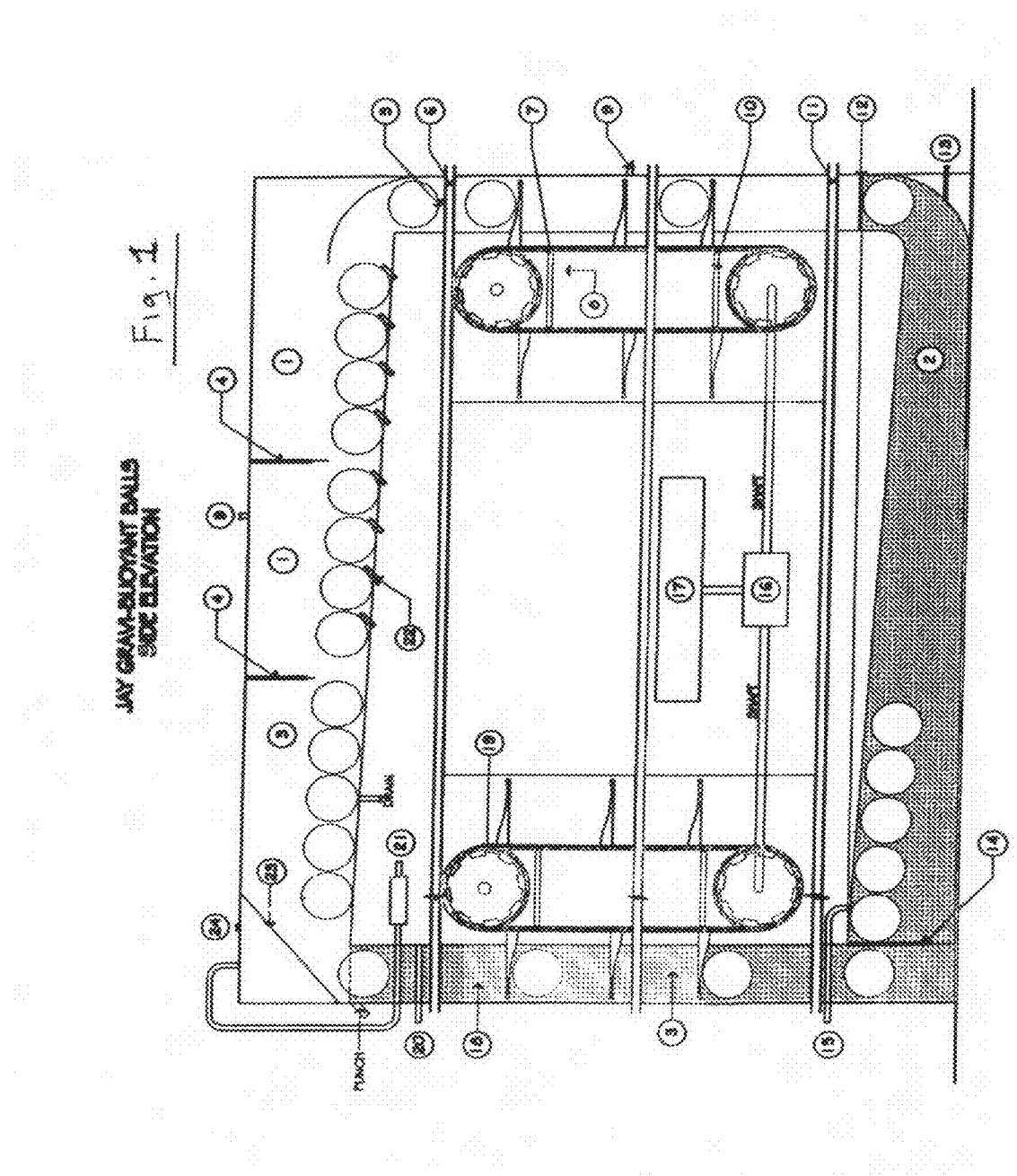
FIG. 1—Side elevation of the invention
FIG. 2—Side elevation with doors in chamber I at the top closed and chamber 3 filled with water.
Figure 2:
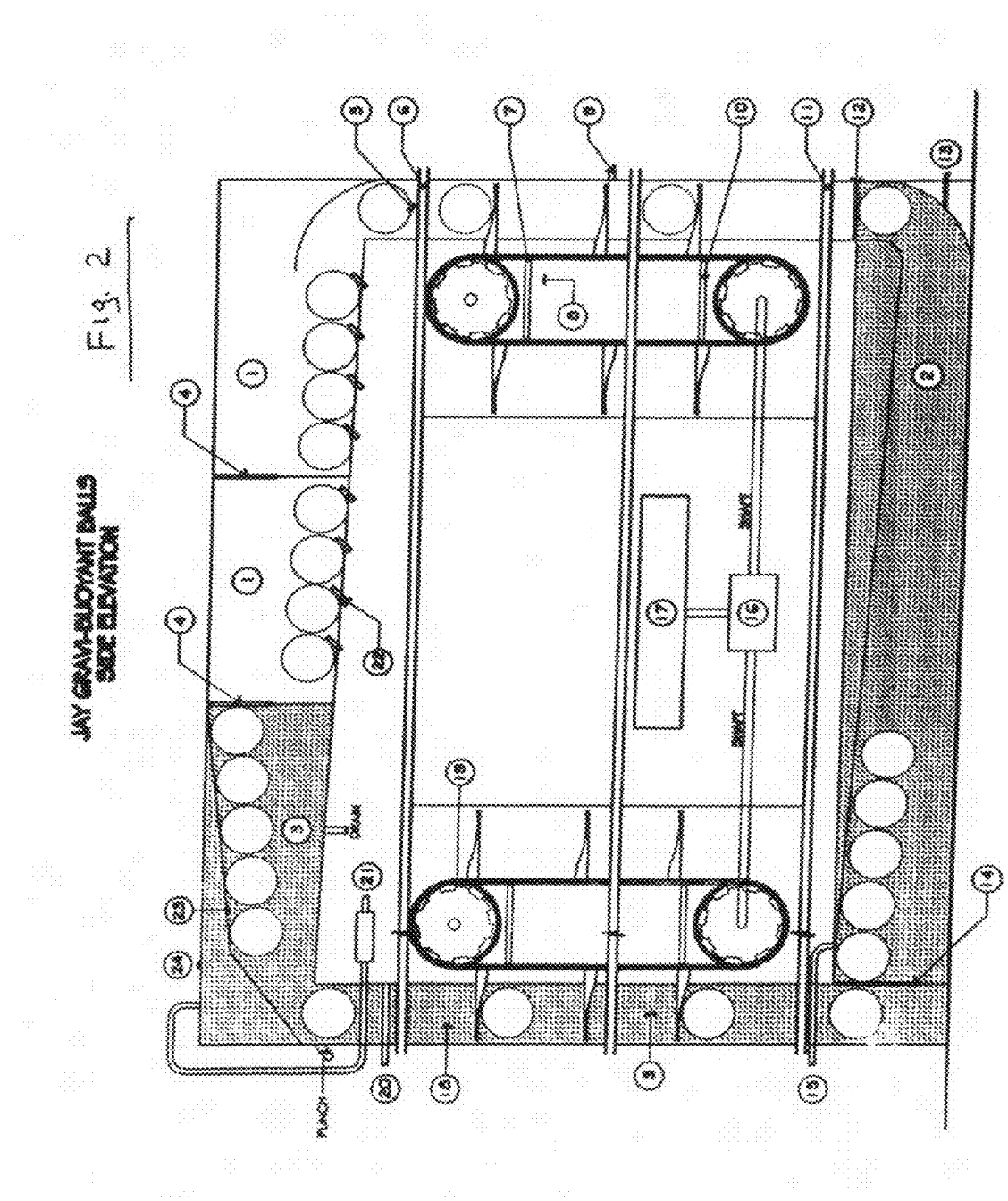
Figure 3:
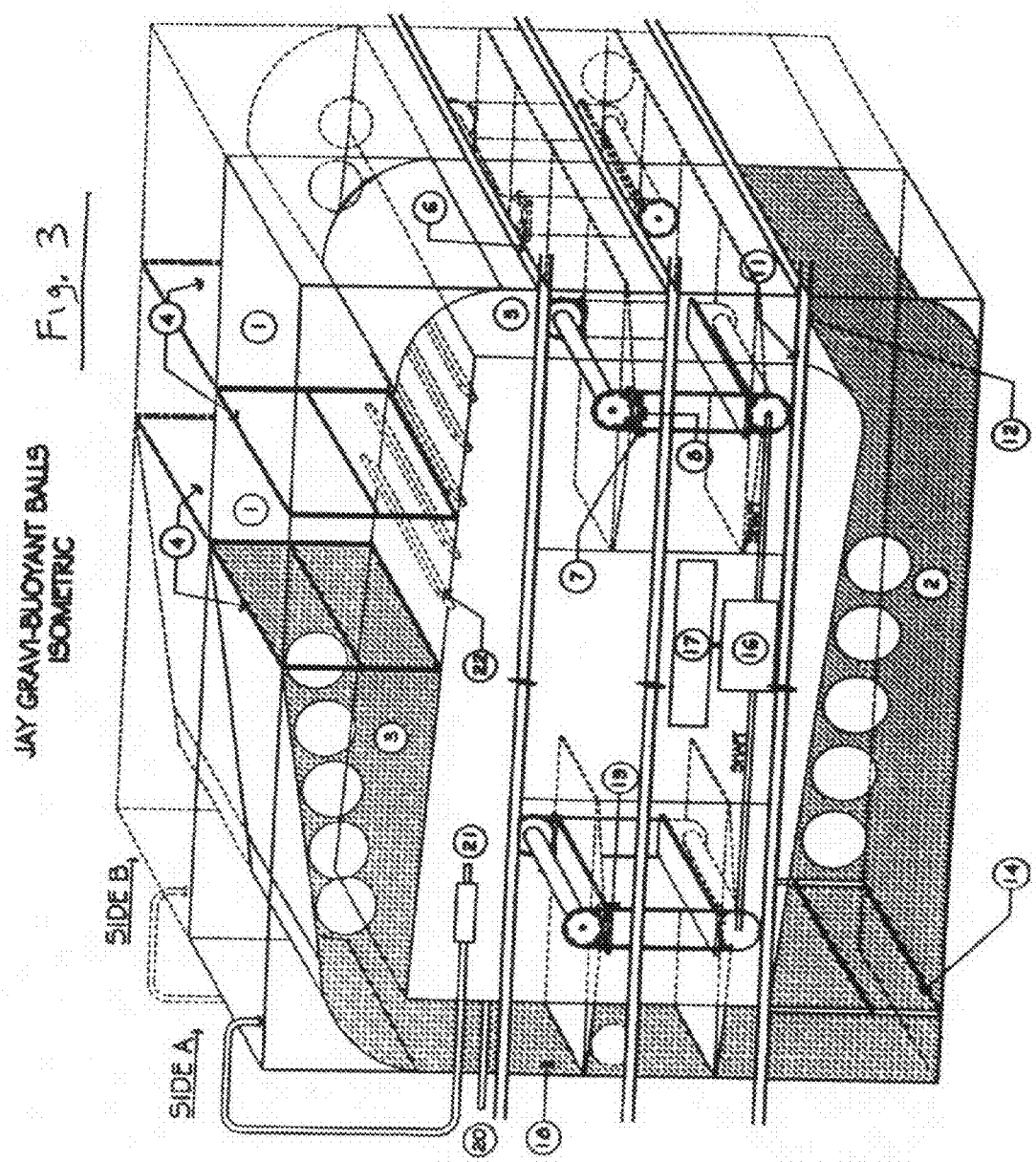
FIG. 3—Isometric view of the invention.
Figure 4:
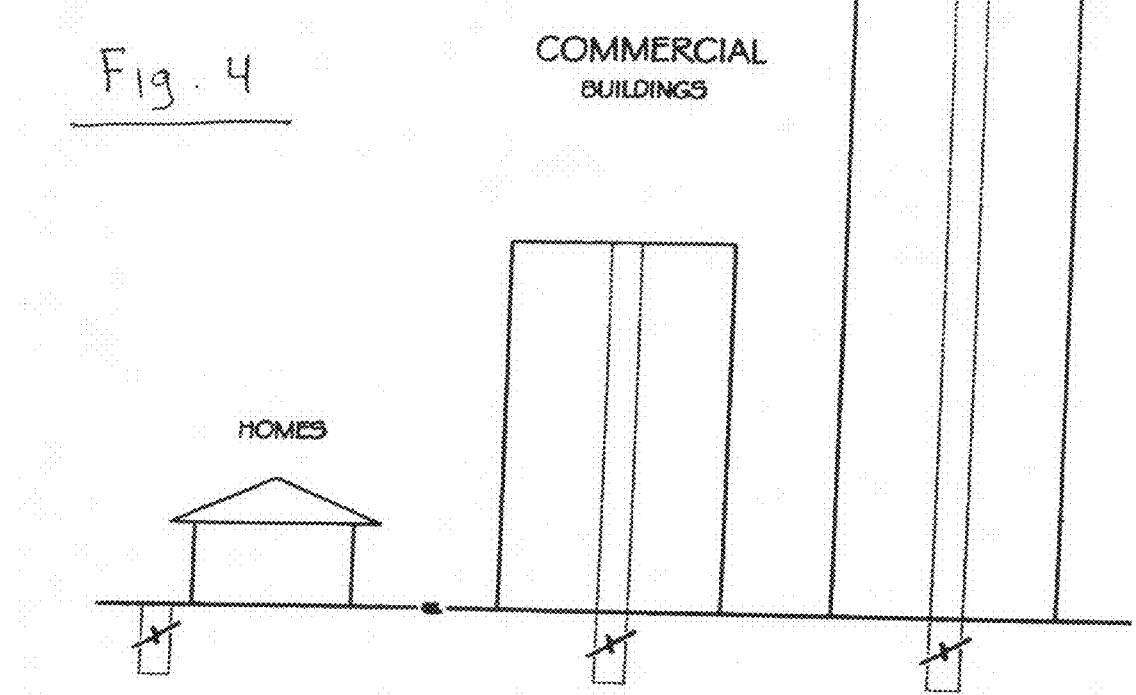
FIG. 4—Applied to residential and commercial buildings.
Figure 5:
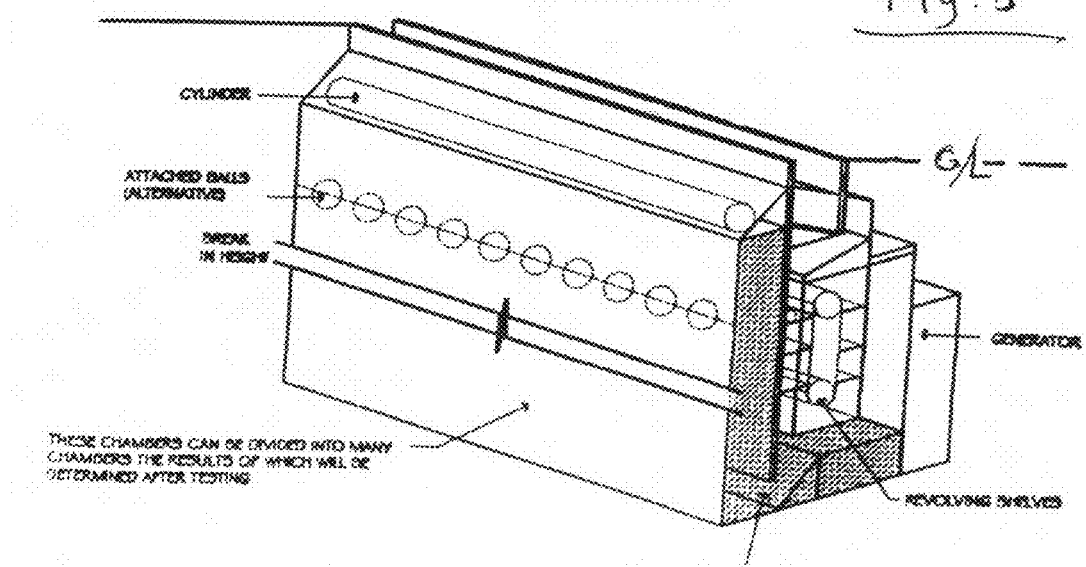
FIG. 5—Power plant design
FIG. 6—Lakeside application for power plant
FIG. 7—Earth Hole
Figure 6:
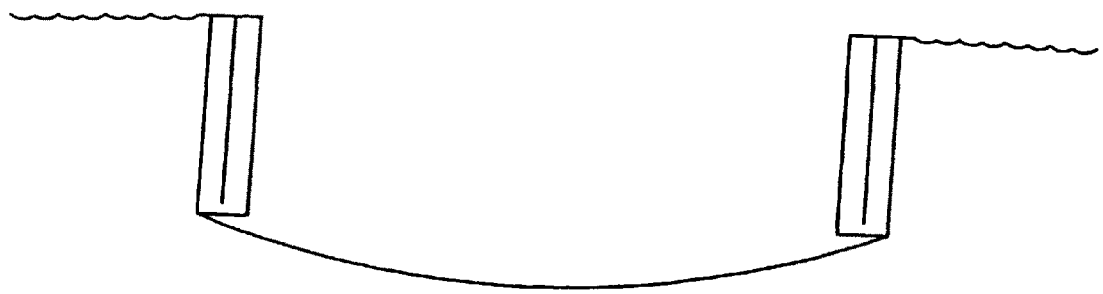
Figure 7:
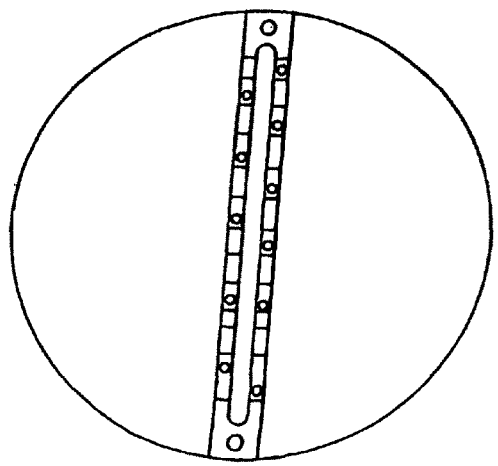

The three natural states of matter, gas, liquid and solid all having their specific composition, position, function and purpose in space can be used in conjunction with each other to create energy. Their special arrangement in space used in a totally different manner and application compared to traditional designs has resulted in the creation of this invention where specifically buoyant, durable mainly solid and spherical bodies or objects of a certain weight, volume and density drop down through a high rectangular chamber enhanced by the pull of gravity applying it's mass to inflict a force upon a lever, bar or handle type mechanism or device driving it to rotate producing electricity from an attached alternator (generator) and continuing on to drop into a water filled transfer chamber, a 2nd chamber at the bottom separated by two doors, one on each end where the entering buoyant bodies float up through the water guided by a deflector and move on through the second door into an attached water filled 3rd chamber continuing on to float back up to it's starting position where it was originally released. After the falling spherical buoyant objects are released from the levers or handles they are driving, they drop from a pre-designed height that would cause them to enter the bottom water filled 2nd chamber or transfer chamber and drop low enough to deflect off a diverter panel and rise towards the attached 3rd chamber by their buoyancy and by another upwardly sloping deflection panel. In the 2nd chamber, as one door closes behind them and another door opens in front, the objects or bodies passes through the second opening into chamber 3 taking advantage of the composition of the liquid to defy gravity and floating up through the liquid or water to the top driving another set of rotating levers if efficiently feasible back to it's original position in the 1st chamber where it will start the process all over again continually circulating up and down.

The transfer chamber in the bottom, the 2nd chamber, have doors that open in sequence allowing the passage of the buoyant bodies and objects but also closing after their passing to prevent the seepage or movement of water and pressure between the two water filled chambers 1 and 2 to maintain the necessary constant high water levels in order for the bodies or objects to circulate, dropping down into the water filled chambers on one side and floating back up on the other side and continuing around again.

In addition, once the liquid is at the desired level at the top, a punch on the side of the chamber is used to push them onto the platform or a standby system is available where a standby door at the end of chamber 3 on top will close filling the chamber with water, floating the buoyant bodies to the top and then releasing the water to drain into a water storage chamber below to cause the bodies to descend back onto the platform and roll down into chamber 1 and off the edge down the high chamber. Other standby systems are also available if there is a malfunction in the opening and closing of the two doors in the transfer chamber at the bottom in chamber 2 or if it is determined to be inefficient. There is two standby doors on the top between chambers 3 and 1 to create a vacuum that will be sufficient to hold the water at the same level (which will also reduce the amount of energy required to open and close the doors in the transfer chamber) on top and below or the two standby doors can be used to trigger the injection of compressed air into chamber 1 to again maintain the high water level in chamber 3 creating another transfer chamber for the passage of the spherical bodies where both systems will be available to allow the passage of spherical bodies and objects from one chamber to another without effecting water levels, all adding to the efficient functioning of the process and invention.

To continue the process without disruptions of electricity production, another exact setup, chambers and mechanism is attached side by side where when spherical bodies are rolling slowly on top dropping down to the 2nd chamber, the transfer chamber on the bottom on one side, more buoyant bodies in an attached setup are floating to the top and filling the chambers on top on the other side. Both sides have rotating mechanisms that generate electricity on each end as their common connection.

Using gravity's potential to the fullest, the following ingredients or variables can be adjusted to determine the dimensions needed in the mechanism in order to attain the specific watts or power desired:

The mass or weight, volume and density of the mainly solid, spherical bodies and objects to drive the rotating mechanism that create the mechanical energy for electricity production and that determine the size of the chambers and devices in the invention as they maneuver and circulate between it's sections.

The height at which the bodies and objects are dropped and the frequency of the drops.

Finally, the strength and proper functioning of the doors in one chamber controlling and maintaining the height and amount of water in the attached chamber.

The dynamics discovered in this patent is the use of these three simple states of matter, air or gas, water or liquid and solids to create a phenomenon where in one chamber, buoyant, spherical bodies or objects will use the gravitational force to drop and accelerate impacting a lever mechanism to generate electricity and in another attached chamber to defy that same gravitational force long enough for these buoyant bodies and objects to float and reach the original starting height to once again use gravity to it's fullest potential completing the motion or loop to start all over again.

This gravitational force not only has existed since the beginning of time but it is always available everywhere, all the time without searching, discovering, mining and redesigning the earth or the environment. It is the force that keeps everything together and in tact. We know it's power, what it's capable of and that it is always there, everywhere, all the time. Mass or weight has a huge amount of energy behind it when it is coupled with the pull, speed and acceleration of gravity where it then can be the supply for an endless amount of energy.

This invention will bring science closer to a Perpetual motion machine that produces electricity.

This is what has been disclosed in this document.

SUMMARY OF INVENTION

The purpose of the invention is to provide a clean, green and simple system that will generate electricity anytime and anywhere without the constraints of geography, the limitations of climate and the time of day using as few ingredients as possible applying only the general nature of the three states of matter: gas, liquid, solid and the one force that binds them all-gravity.

In this system, Buoyant Bodies or Objects of any size drop down to the bottom of Chamber "1" driving a rotating mechanism attached to a alternator to generate electricity into Chamber "2" through a door, Deflect over by Diverters and float up to enter through another door into Chamber "3" and float upward continuously one after another driving another set of rotating levers with little energy wasted for their lift thereby producing constant energy or electricity from their continuous drops in Chamber "1" and continuous lifts in Chamber 3 no matter what size or at what height, anywhere, anytime merely by the adjustment of their weight, volume and height level, the three variables that will determine energy production.

What is significant in this system is that the lift needed for an object of any weight and size to reach any height level and then drop from that height to produce the desired amount of electricity requires no energy. Since gravity is always available and requires no energy to produce, lift will also. Lift, which is the energy required to propel a weight to a specific height for a desired drop that will result in the desired power output may seem inefficient using a solid instead of more flexible states as gas and liquid but if that required lift force and if possibly the reduction in efficiency is free without any effort or waste of energy and with virtually no change on the environment, it has no significance. Once lift is available without any effort for free thru this system, all that is necessary for any required amount of energy or electricity production is to merely adjust the amount of weight and height. A downward fall and speed of a mass or weight can last as long as the force of gravity permits minus the friction of the generator shaft depending on the height of the fall or drop. Therefore in determining power, the weight, the height and the coasting or float in the generation of electricity has to be taken into consideration when determining the frequency of drops minus the power needed to operate the doors and their sensors in the Transfer Chamber (chamber 2) and chamber 1 if necessary, the inlet valve for more water and air if necessary and the punch in Chamber "3" if necessary.

This invention or system can be implemented from now on for energy or electricity production without any further need for environmental alterations or chemical interactions finally promoting a safe and green environment.

These devices can be installed by simply excavating in any field, yard, underneath a building foundation, in any home owners basement or yard or in any commercial building low or high, incorporated in the structure's center similar to an elevator shaft or underneath below ground level. It can also be installed or constructed on the ground similar to a building if so desired. Power plants can be constructed anywhere without disrupting the terrain with unattractive buildings and machinery polluting the environment with coal or any other material used in firing furnaces and rotating turbines or worse disrupting and rerouting our rivers for dams or still yet unreliable windmills and solar panels and other contraptions covering the earth. Plants can be established in any location neatly secluded underground or disguised as a simple residential building above ground. The power output for power plants can be determined by increasing the size and weight of the circulating bodies or objects, increasing their height of fall, attaching them together or by creating a long cylinder that would achieve the same results depending on the output desired.

If a lake or pond could be sealed off or only it's edges where all along it's shoreline this device was installed and connected to maintain the water level without allowing it to decrease in height in an attached chamber, a fully functioning and circulating energy production unit can be created.

If the earth had a hole excavated from one side to the other thru it's center with this system attached, the bodies would drop back and forth from one side to the other rotating a mechanism such as a revolving chain forever by the earth's gravitational pull producing an endless supply of energy and electricity.

Descriptive Examples

Size

An applicable size for the above example is a 4'-0" wide× 8'-0" long×60'-0" high machine dependant on size and weight of the buoyant, spherical objects or balls which may be many. Plants can be established in any location that has the space ranging from 300'-0" in length and height, and 30'-0"-50'-0"

in width neatly hidden underground or disguised as a simple residential building above ground.

Power Plants can be created by increasing the size and weight of the objects (balls) attaching them together or creating a long cylinder that would achieve the same results. Cylindrical or attached spherical bodies that will be used in large plants will vary in weight from 100,000 lbs on up. Bear in mind that the large windmills which is becoming a part of the electrical grid constructed in open vacant land have a bulk or mass of approximately 32 tons or 72,000 pounds to 100 tons or 200,000 pounds or more.

LEGEND

| SYMBOL | DESCRIPTION |
|---|---|
| 1 | CHAMBER 1 |
| 2 | CHAMBER 2 |
| 3 | CHAMBER 3 |
| 4 | IN CASE OF MALFUNCTION OF DOORS IN CHAMBER 2, DOORS IN CHAMBER 1 (WITH SENSORS) ON BOTH SIDES A AND B IS FILLED WITH WATER AND THEN DRAINED BELOW TO TOP POINT WHERE BALLS CAN ROLL BACK INTO CHAMBER 1A AND 1B TO START OVER AGAIN. A PUNCH ON SIDE CAN ALSO PUSH BALLS. |
| 5 | USING TWO TUBES A AND B. BALLS SWITCH TUBES DEPENDING ON WHICH TUBE BOTTOM IS EMPTY AND WHICH IS FULL. EMPTY CHAMBER. RELEASES BALLS AT BOTTOM UPWARD AS FULL CHAMBER ON TOP RELEASES BALLS FOR DROP DOWNWARD. |
| 6 | BREAK IN HEIGHT NOTE: ENOUGH HEIGHT FOR MAXIMUM GRAVITY TO LOAD AND CAUSE SHELVES TO TURN BASED ON RPM. |
| 7 | ATTACHED TO SIDE OF CHAMBER |
| 8 | REINF. BARS FOR REVOLVING SHELVES ATTACHED TO CHAIN ROLLING ON INDENTED BALLBEARING LINED TRACKS ATTACHED TO GENERATOR |
| 9 | INLET (AIR COMPRESSION) USED TOGETHER WITH DOORS IN CHAMBER 1 TO SEAL OFF AND CREATE AN INCOMPRESSILE CHAMBER 1 IN ORDER TO MAINTAIN HIGH WATER LEVEL IN CHAMBER 2 AND 3. (SEE #4) |
| 10 | ATTACHED TO SIDE OF CHAMBER |
| 11 | BREAK IN HEIGHT NOTE: ENOUGH HEIGHT FOR BALLS TO DROP LOW IN WATER ENOUGH TO DIVERT INTO CHAMBER 2 AND THEN TO CHAMBER 3 THROUGH DOOR |
| 12 | DOOR "Y" AND "Y1" OPENS WHEN BALLS FALL DEPENDING ON WHICH CHAMBER IS EMPTY 2A OR 2B. DOORS HAVE SENSORS. |
| 13 | WATER DRAIN INLET |
| 14 | DOORS X1 AND X2 W/SENSOR (OPENS OUT ON INSIDE) OPENS WHEN CHAMBERS 2A AND 2B IS FULL TO RELEASE BALLS TO FLOAT UPWARD TO TOP IN CHAMBER 3. |
| 14 | DOORS X1 AND X2 W/SENSOR (OPENS OUT ON INSIDE) OPENS WHEN CHAMBERS 2A AND 2B IS FULL TO RELEASE BALLS TO FLOAT UPWARD TO TOP IN CHAMBER 3. |
| 15 | WATER SUPPLY |
| 16 | GEARBOX |
| 17 | GENERATOR OR ALTERNATOR. |
| 18 | TUBES FOR BALLS TO FLOAT UPWARD |
| 19 | REVOLVING LEVERS CONNECTED TO GENERATOR SAME AS 5 |
| 20 | SUPPLY WATER TO HOUSE |

-continued

LEGEND

| SYMBOL | DESCRIPTION |
|---|---|
| 21 | PUMP AND WATER STORAGE |
| 22 | TENSION STOPS TIMED TO RELEASE DROP OF BALLS |
| 23 | DIVERTER (SAME AS IN CHAMBER 2) |
| 24 | WATER SUPPLY |

NOTE:
BALLS ARE TIMED TO DROP AND FLOAT UPWARD CIRCULATING AND GENERATING ELECTRICITY WITHOUT DISRUPTION CONSISTENTLY BY TWO CHAMBERS AT BOTTOM AND TOP WITH VERTICAL TUBES IN FRONT AND BACK CONNECTING THEM.

The invention claimed is:

1. A circulation system for generating electricity comprising two sides, each of said side comprising:
a plurality of circulating spherical objects, wherein said spherical objects being composed of materials that maintain the same structure and chemical composition when released from a first chamber filled with air from a high altitude;
said first chamber having a platform to keep said spherical objects, and said first chamber having size, weight and height determined according to needed power wattage, said first chamber having two standby standard, sensor induced, electrically actuated entry doors;
a first mechanism having a first set of levers located inside a tube, said mechanism being connected with an alternator;
said tube connected with said first chamber for accepting said spherical objects falling down from said first chamber to activate said mechanism through said first set of levers to drive said alternator to produce desired electricity and power wattage;
a second chamber connected with said tube for accepting said spherical objects from said tube through a first door, said transfer chamber being filled with a liquid; said transfer chamber having a side diverting panel and an upwardly sloping deflection panel for transferring said spherical objects to a third chamber;
a second mechanism having a second set of levers located inside said third chamber and connected with said alternator;
said third chamber being filled with liquid and connected with said second chamber through a second door at the bottom thereof, and connected with said first chamber at the top; wherein said third chamber transfers said spherical objects by buoyancy force from the second chamber to the first chamber, thence to said platform, back to the original position to start a new cycle; wherein said spherical objects drive said second mechanism through said second set of levers and said alternator;
a bend section connecting said second chamber with said third chamber;
wherein said two entry doors of the first chamber open and close in sequence to allow the passage of the spherical objects between said third chamber and first chamber thereby preventing the seepage or passage of water and pressure between said first and second chambers by creating a vacuum in order to maintain a constant high water level in the third chamber for the spherical objects to circulate
wherein said first and second doors of the second chamber open and close in sequence to allow the passage of the spherical objects between said second and third chambers thereby preventing the seepage or passage of water and pressure between said second and third chambers in order to maintain a constant high water level in the third chamber for the spherical objects to circulate;

wherein on the first side, the spherical objects roll down on top of the first chamber and then drop to said second chamber, at the same time on the second side, the spherical objects in the second chamber are being released to float to the top thereby filling said first and third chambers; both sides have the rotating mechanism that generates electricity on each end as their only common connection.

2. In the circulation system of claim 1, wherein said spherical objects are constructed of a durable non-corrosive materials.

3. In the system of claim 1, wherein the spherical bodies are constructed by a material with specifically designed for weight and for buoyancy and having proper proportions of volume and mass to attain the desired power.

4. In the system of claim 1, wherein said first chamber is located on the top, said platform has an inclined surface for directing said spherical objects down into said tube.

5. In the system of claim 1, wherein the system includes a rolling incline with tension clips providing a timed drop in coordination with the rotating mechanism below.

6. In the system of claim 1, wherein the first chamber has a predetermined distance between the point of falling over the edge of the object from the platform and the height of the rotating mechanism, handle or lever receiving the impact in the tube below, for creating a more forceful impact by gravity and a smoother, consistent spin of the shaft which is attached to the alternator for maximum efficiency.

7. In the system of claim 1, wherein at least one of the mechanisms and levers and handles are spaced for maximum efficiency for further preventing of jamming between the objects and the mechanism receiving the impact.

8. In the system of claim 1, wherein a gearbox connected to the generator produces relatively low revolutions per minute to prevent jams between the objects and the receiving mechanism or levers.

9. In the system of claim 1, wherein the spherical objects have predetermined proportions of volume and mass for buoyancy continue on to fall to the bottom through said first door into the water in said second chamber, where the distance from the release of the body from the levers and the level of the water in said second chamber is high enough to cause the objects when dropped to submerge low enough below the top diverter panel and bounce off the side diverter panel to deflect toward said third chamber.

10. In the system of claim 1, one of said standard, sensor induced, electrically actuated entry doors is located between the first chamber and the second chamber to allow the objects to drop from the first chamber to the second chamber.

11. In the system of claim 1, wherein after the deflection from the side diverter panel, the objects continue to rise by their buoyancy guided towards a doorway in the third chamber by a second upwardly sloping top deflection panel.

12. In the system of claim 1, wherein the top and side diverter panel is designed and adjusted for providing the maximum angle for divergence.

13. In the system of claim 1, wherein the system further comprising a sensor activated inlet valve in said first chamber for a compressor arranged to inject compressed gas or air into said first chamber creating an equal balance to pressure the water in said second and third chambers to remain at the same high level in case failure of the doors in the second chamber causes the water levels in said second and third chamber to descend back up into the first chamber.

14. In the system of claim 1, wherein said first and second doors are standard, sensor induced, electrically actuated doors; once the spherical objects are inside the second chamber, said first door is close behind them while said second door is open in front on the attached third chamber combining the two bodies of water, the closed door between first and second chambers acts as a stop to prevent the descent of the water into the first chamber and the equalization of the water level.

15. In the system of claim 1, wherein a hydraulic punch is located on the side at the top of the third chamber to push the spherical objects onto a holding platform in said third chamber.

16. In the system of claim 1, wherein a drain and a water pump are provided to release water to lower the spherical objects below the top sloping diverter and after to raise the water level to cause the buoyant objects to rise towards the second door on said third chamber using the top diverter panel as a guide.

17. In the system of claim 1, wherein said third chamber has a standby door to permit the chamber to be filled with water forcing the objects to rise towards the wall above the standby door separating said first and third chambers using a second sloping diverter panel.

18. In the system of claim 1, wherein said two standby standard, sensor induced, electrically actuated entry doors are located at the top of the first chamber in case there is a malfunction of the two doors in the second chamber, said electrically actuated entry doors open and close and act as a transfer chamber when air compression is used to prevent the equalization of the water level in the system and to create a vacuum in the first chamber and the third chamber.

19. In the system of claim 1, wherein some of the electricity generated in this system will be used to operate the entry and exit doors including sensors in said first, second and third chambers.

20. In the system of claim 1, wherein batteries or a power grid are provided for storing the produced electricity.

* * * * *